Dec. 19, 1950  C. A. GREINER ET AL  2,534,767
METHOD FOR SEVERING THE HEADS FROM THE BODIES OF SHRIMP
Filed May 3, 1948  3 Sheets-Sheet 1
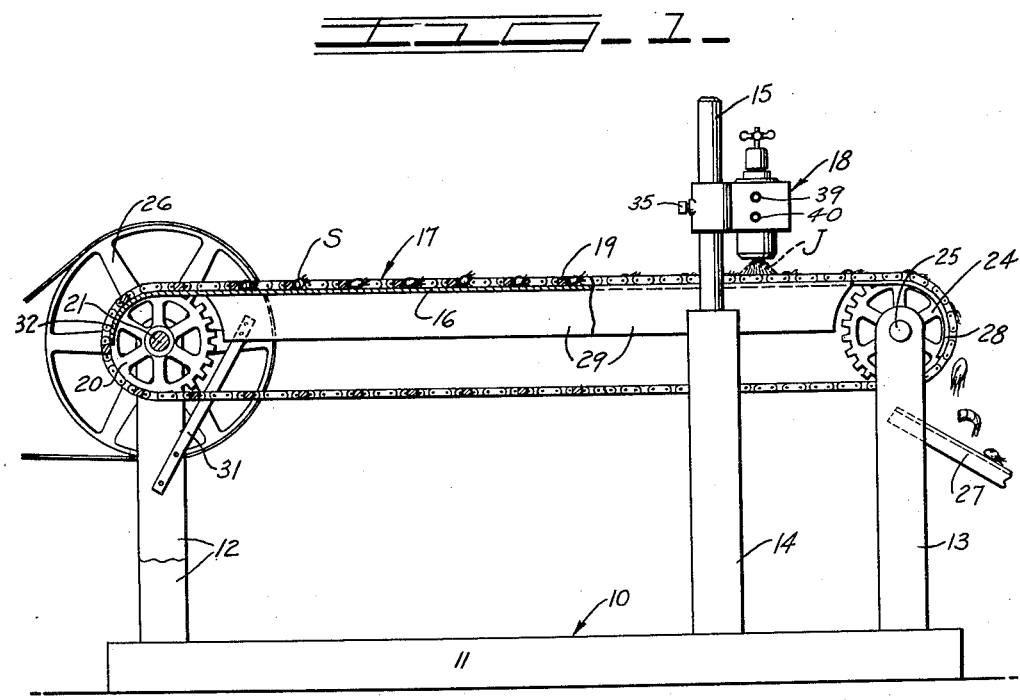
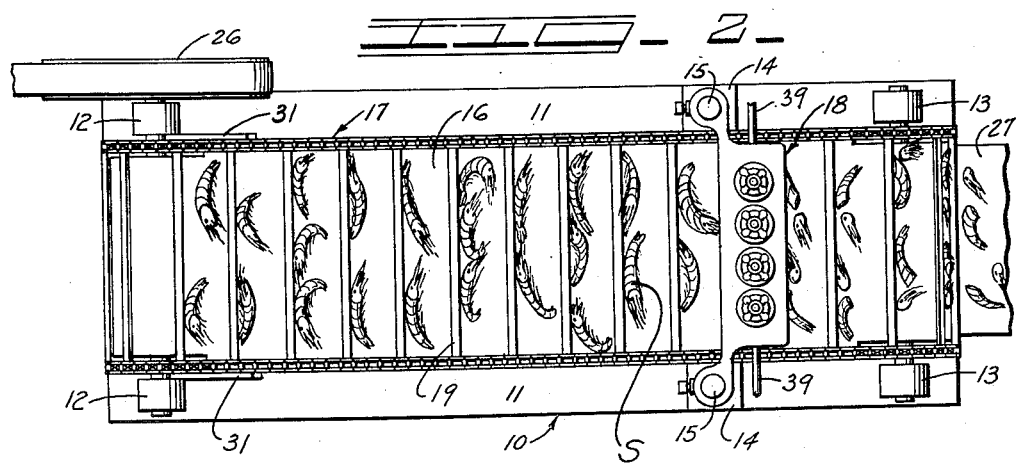
Inventor
Charles A. Greiner
Elbert F. Greiner
By
H. R. Wilson & Co.
Attorneys Dec. 19, 1950     C. A. GREINER ET AL     2,534,767
METHOD FOR SEVERING THE HEADS FROM THE BODIES OF SHRIMP
Filed May 3, 1948     3 Sheets-Sheet 2
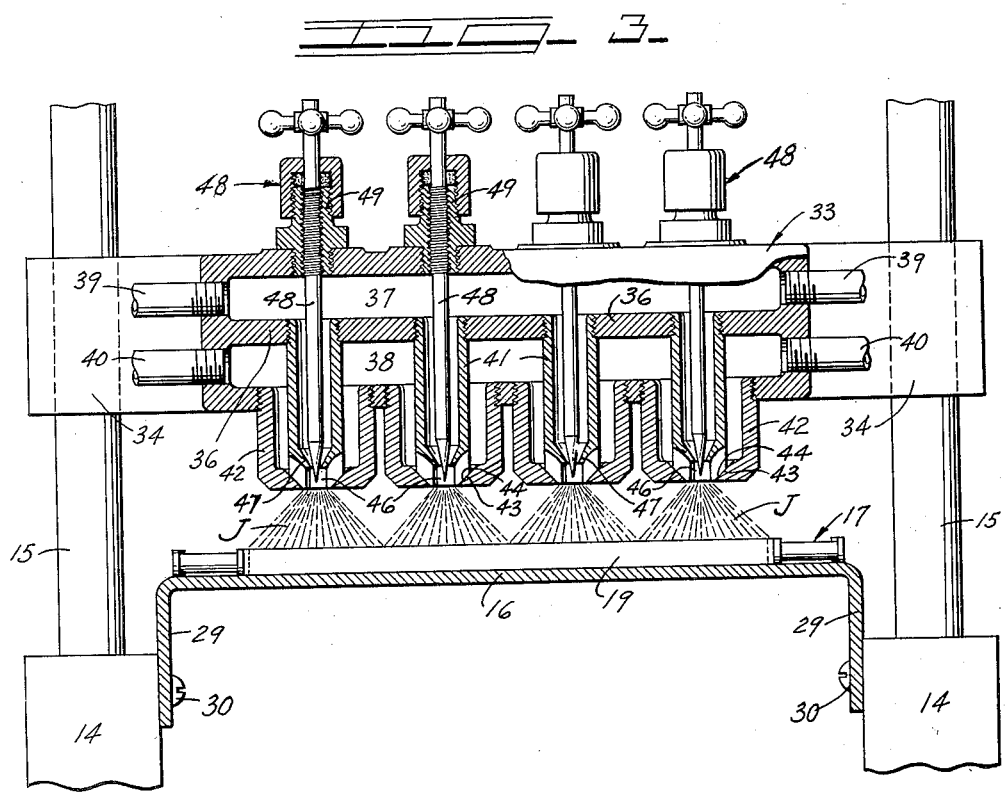
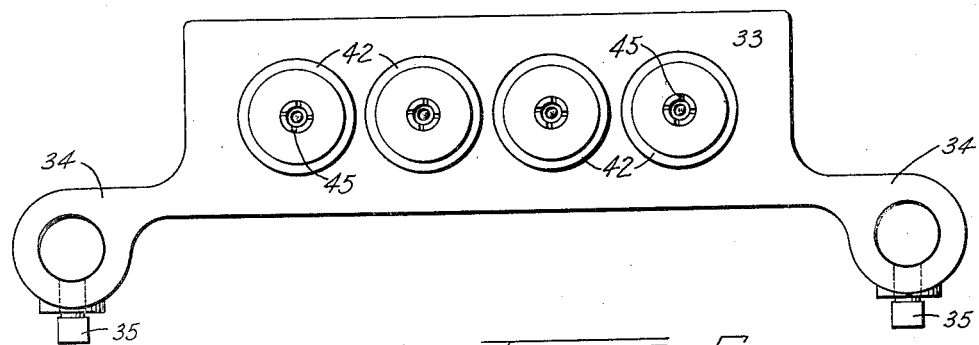
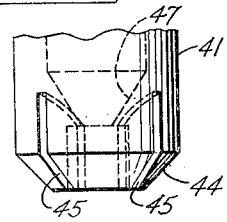
Inventor
Charles A. Greiner
Elbert F. Greiner
By H. R. Willson & Co.
Attorneys Inventor
Charles A. Greiner
Elbert F. Greiner By H. B. Willson & Co.
Attorneys Patented Dec. 19, 1950

2,534,767

UNITED STATES PATENT OFFICE 2,534,767

METHOD FOR SEVERING THE HEADS FROM THE BODIES OF SHRIMP

Charles Allen Greiner and Elbert Forrester Greiner, New Orleans, La.

Application May 3, 1948, Serial No. 24,778

11 Claims. (Cl. 17—45)

Our invention relates to the preparation of shrimp for the market and more particularly to the removal of the heads from the bodies of shrimp.

It is customary to separate the heads from the bodies of shrimp promptly after the latter are removed from the water and so far as we know that operation has been performed manually in the past. The operation requires time and increases the cost to the consumer of the edible portion of shrimp.

We have discovered that the heads of shrimp, as well as the legs or crawlers and other hanging members or parts of shrimp, may be blasted from their bodies by the impact of a jet or stream of fluid under pressure; and the primary object of our invention is to provide a method or process which will eliminate the usual manual operation of pulling the head from the body of a shrimp.

Another object of the invention is to provide a method of this character which is simple and effective and by which large quantities of shrimp may be beheaded and cleaned rapidly and at small expense.

A further object of the invention is to provide an apparatus or machine for beheading shrimp by a fluid pressure medium, which is simple and comparatively inexpensive in construction and which is rapid and highly effective in operation, so that its use will effect a great saving over the old manual procedure of individually breaking the heads from the bodies of shrimp.

With the above and other objects in view as will hereinafter appear, the invention resides in the new procedures and in the new structures, combinations and arrangements of parts set forth in the following description and defined in the appended claims.

In the accompanying drawings which show partly diagrammatically two forms of machines, Figure 1 is a side elevation with parts in section of our present preferred apparatus which may be used in practicing our method.

Fig. 2 is a top plan view.

Fig. 3 is an enlarged detail cross sectional view showing the interior construction of the blast head.

Fig. 4 is a bottom plan view of the blast head.

Fig. 5 is a detail end view of the atomizing tip of one of the atomizing nozzles.

Fig. 6 is a detail side view of one of the atomizing tips.

Figure 7:
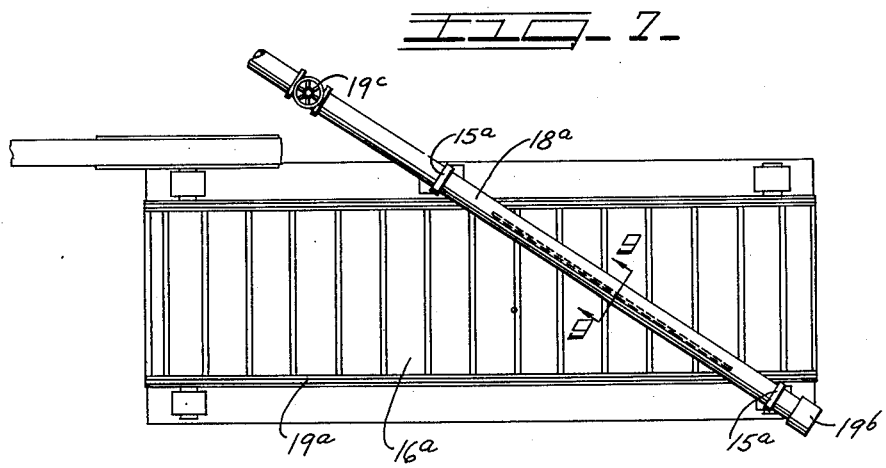
Fig. 7 is a diagrammatic top plan view of another form of apparatus.

Our method may be practiced by the use of machines or apparatus of various forms which will create a sufficiently powerful pressure-fluid blast having one or more jets of the pressure medium and which will permit relative movement of the blast and the suitably supported shrimp so different portions of the shrimp will be brought under the action of the jet or jets of the blast and the joint connecting the head of the shrimp with the shell of the body will receive the impact of the blast to cause the mechanical force of the fluid to detach the head from the body. In the form shown in Figs. 7-9 the blast head or nozzle creates a single narrow or sheet-like jet or stream as hereinafter described, but in the preferred form of apparatus shown in Figs. 1-6 the blast, while elongated, is composed of a row of cone-shaped or funnel-shaped jets issuing from atomizing nozzles, so that the entire shrimp will be subjected to a tornado-like blast which will strike the juncture of the head with the shell of the body of the shrimp as the latter passes through the blast during relative movement of the shrimp and the blast. The shrimp must be suitably supported but not necessarily in a single layer spaced more or less from each other as shown in the drawings. On a flat surface, one side or the other of the shrimp will be uppermost, but the blast is sufficiently powerful to sever the heads from the bodies even if the shrimp are more or less on top of each other and do not have one or the other of their flat sides uppermost. The blast wall also sever the swimming legs or crawlers and other hanging members or parts of the shrimp. The blast should be directed toward the shrimp and preferably in a substantially perpendicular direction so that when the shrimp are moved through the blast or the blast is moved over the shrimp, the jet or jets will strike the joint connecting the head with the body of the shrimp. Obviously, the body of the shrimp might be held in the hand and moved so that the blast will strike the head, or the nozzle might be moved to direct the blast against the head, but in what we believe is the most practical procedure the shrimp are moved by an endless conveyor of any suitable construction under a stationary blast head or nozzle.

The pressure medium may be water or other liquid under suitable pressure, or steam, air, natural gas or any other suitable gas under sufficient pressure, or a mixture of a liquid and a gas under suitable pressure. When water or other liquid alone is used, we have found that a pressure of 50 pounds per square inch is effective in beheading the shrimp when the conveyor travels at about 20 feet per minute. The pressure may be as high as 200 pounds when the shrimp are moved at the rate of about 100 feet per minute. The pressure may vary from 10 pounds up depending upon the kind and size of nozzle or blast head that is used. When one or more atomizing nozzles are used to produce circular or cone-shaped jets, we preferably used water and steam, the steam having a pressure of from 40 to 100 pounds per square inch and the water may be under a pressure of from 10 to 100 pounds per square inch. The water may be fed to the nozzle by gravity. With these pressures the travel of the shrimp would be about 75 feet per minute.

Referring to Figs. 1–6 of the drawings, the numeral 10 denotes a suitable supporting frame which may be of wood and consists of two longitudinally extending base beams 11 suitably connected and adapted to rest upon the floor. Rising vertically from the base adjacent its ends are pairs of front and rear posts or standards 12, 13. A pair of intermediate standards 14 also preferably of wood, rise from the base and carry metal posts 15 at their upper ends. The standards 12, 13 support a flat, elongated table top 16 and an endless conveyor generally indicated at 17 while the posts 15 support a blast head or nozzle 18 which extends transversely above the table and conveyor. The latter preferably consists of two sprocket chains having their links connected at spaced intervals by cross slats or cleats 19. At the front of the machine the chains pass around sprocket wheels 20 fixed to a transverse shaft 21 journaled in suitable bearings on the standards 12, while at the rear or discharge end of the machine the chains pass around sprockets 24 fixed to a shaft 25 journaled in suitable bearings on posts 13. The conveyor may be driven in any suitable manner as by a belt passing around a pulley 26 fixed to one end of shaft 21. Mounted on standards 13 is an inclined discharge chute 27. The table top 16 may be a flat metal plate secured in any manner to the standards 12, 13, 14 and disposed under the upper stretch of the conveyor so that the cleats 19 will push shrimp indicated at S along the top 16 and through the blast from the head or nozzle 18 and then off onto the chute 27. The top 16 has its rear end 28 rounded or curved to conform to the travel of the conveyor over the sprockets 23 and thus direct the shrimp bodies and their severed heads and other parts onto the chute 27 as will be seen on reference to Figs. 1 and 2. The top 16 may have depending side flanges 29 which stiffen it and which may be secured to standards 14 as shown at 30 in Fig. 3. Suitable supporting brackets 31 may connect the flanges 29 to the posts 12 or 13 or both. The front end 32 of the top is also preferably curved or rounded as seen in Fig. 1.

The blast head 18 as shown in Fig. 3 preferably consists of a rectangular body portion 33 formed at its ends with arms 34 apertured to side vertically on the metal posts 15 so that the blast may be adjusted with respect to the shrimp supported on top 16, set screws 35 being preferably provided in said arms to secure the head in adjusted position. The head is preferably a metal casting having its hollow body 33 formed with a horizontal, longitudinally extending partition 36 to provide an upper water or liquid chamber 37 and a lower steam or gas chamber 38. Water is supplied to the chamber or compartment 37 through one or more inlet pipes 39 tapped into the ends of the body 33 as shown in Fig. 3, and steam is supplied to the chamber or compartment 38 through similar pipes 40. Preferably two of each of these supply pipes, one being at each end of the head, are provided as shown to obtain more uniform pressures in said chambers, and these pipes are flexibly or otherwise suitably connected to the sources of supply of the fluids.

The body 3 carries a row of atomizing nozzles which communicate with the fluid chambers 37, 38 and which direct their cone-shaped jets or streams downwardly as indicated by the broken lines J in Fig. 3. These nozzles are similar to those used for atomizing heavy fuel oil, and each comprises a tube or tip 41 extending through the steam chamber 38 with its upper end threaded into partition 36 for receiving water from the chamber 37. The tube is surrounded by a vapor cup 42 threaded into the bottom of the body 33 and in communication with the steam chamber 38. The cup has its bottom formed with a frusto-conical opening 43 against which seats the similarly shaped portion 44 at the lower end of the atomizing tip 41. The inclined surface of portion 44 is formed with four steam discharge orifices 45. The cone-shaped portion 44 of the tube surrounds a cylindrical atomizing chamber or recess 46 having a diameter and a depth of about ½ of an inch. In the chamber 46 is the seat 47 of a needle valve 48, which controls the discharge of water. The stem of the needle valve is threaded through a bushing 49 and has a handle on its top above a packing gland. The needle valve is adjusted to permit the proper discharge of water into the atomizing chamber 46, and the jets of steam issuing from the orifices 45 create a rotating cone-shaped jet or stream indicated by the broken lines J in Figs. 1 and 3. The orifices 45 are cuts or kerfs made by a circular saw and, hence have concave ends as shown in Fig. 6 to aid in directing the steam into the vapor chamber 46. As shown in Fig. 5 the orifices or slits 45 are offset from true radii around the circular end of the tip so as to produce a rotary motion of the fluids in the chamber 46. The lines J in Fig. 3 represent imaginary lines of force of the atomized spray, and the nozzle or head 18 is vertically adjusted so that the jet will properly strike the shrimp. The nozzles are so spaced in the row that the adjoining jets substantially contact as indicated in Fig. 3. The several jets or sprays thus form an elongated blast extending across the conveyor and the number of nozzles used will depend upon the width of the conveyor. In the apparatus shown four nozzles throwing circular jets 3 inches in diameter will form a continuous 12-inch blast and the conveyor has a width of 12 inches, the bottoms of the atomizer cups being about 1½ inches above the shrimp. The orifices 45 exposed at the bottom of the tip 41 by the opening in the cup 42 measure 8 one-thousandths by 125 one-thousandths of an inch when steam at 100 pounds or more and water at 10 pounds or more are used. These dimensions may, of course, be varied and the needle valve is adjusted to give the desired spray. Obviously, a single atomizing nozzle might be used with a very narrow conveyor, but the construction illustrated has been found to be practical and effective in use, since the shrimp being pushed along the table top by the cleats or bars 19 of the conveyor cannot pass through the blast without the joints between their heads and bodies being hit by the circular or funnel-shaped jets. The spacing of the cleats or bars 19 from each other may be varied and they may be so close to each other that the shrimp virtually lie in troughs formed by adjacent cleats. They should not, however, be so widely spaced that the blast will blow the shrimp about on the table.

When it is desired to use water or other liquid alone as the pressure medium, the needle valve 48 will be closed, water under suitable pressure is supplied to chamber 38 and nozzles with proper orifices will be used.

In using the apparatus shown in Figs. 1–6, the shrimp will be dumped on the table at or near its front end while the conveyor is in motion and the blast is discharging from the nozzles. They may be spread out somewhat and will usually be spaced more or less apart between the cleats 19. Most of them will be lying on one side as the cleats or slats pick them up and push them through the blast. At the discharge end the cleats will push the separated heads and bodies over the curved end 28 of the top onto the chute 27 from which they fall into a suitable receptacle.

We have found the above described apparatus exceedingly effective in beheading not only the common salt water shrimp (*Penaeus setiferus*) but also other species caught in the waters of the southern part of the United States, such as the grooved shrimp (*Penaeus brasiliensis*), the sea bob (*Xiphopenaeus kroyeri*) and others.

Figure 8:
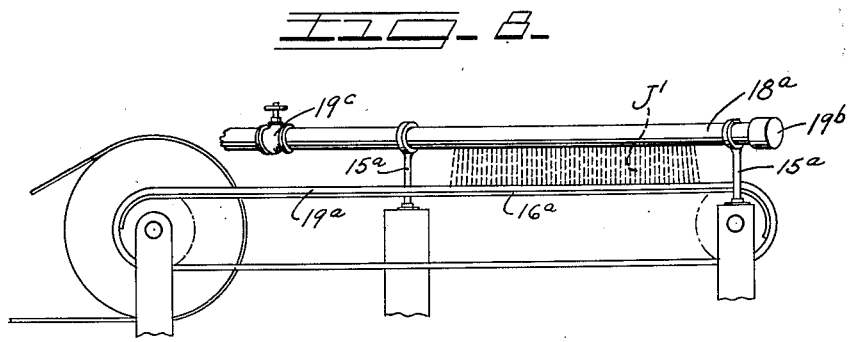
Fig. 8 is a detail diagrammatic side elevation of the apparatus shown in Fig. 7.
Figure 9:
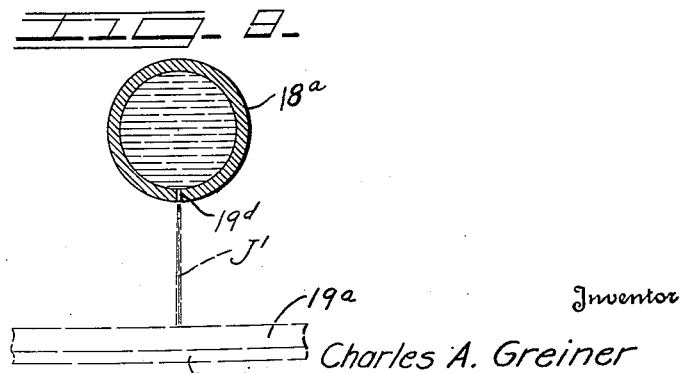
Fig. 9 is a detail section on line 9—9 of Fig. 7.

In Figs. 7–9 we have shown diagrammatically another form of apparatus in which a straight, continuous knife-like jet or stream of water or a fluid may be used as the pressure medium. It also has a cleated endless conveyor 19ª moving over a table top 16ª but the nozzle or blast head 18ª is different. The nozzle 18ª is in the form of a pipe which may extend diagonally substantially from one corner of the table to the other or as shown in Fig. 7. It may be supported at the proper distance above the conveyor by standards 15ª and has one end closed by a cap 19ᵇ while its other end is connected to a source of supply of a fluid under pressure, water being preferably used. A control valve 19ᶜ may be used to regulate the amount of water passing to the nozzle. The broken lines J' represent a straight, narrow, sheet-like jet of water or other fluid issuing from either closely spaced apertures or a continuous slit 19ᵈ formed in that portion of the bottom of pipe 18ª which is above the conveyor. The slats or cleats of the conveyor in pushing the shrimp over the table will cause them to be disposed transversely of the conveyor and the fact that the narrow sheet-like jet J' is continuous and diagonally positioned, will make it impossible for the shrimp to pass under the jet without the joining point between the head and body receiving the impact of the blast. This kind of machine will obviously require the use of a much larger quantity of water than of our preferred construction.

While we have described in detail the preferred method of practicing our invention and have illustrated in detail and fully described a preferred form of apparatus, it will be understood that the invention is not confined to the precise details herein set forth by way of illustrations, as it is apparent that changes and variations may be made therein, by those skilled in the art, without departing from the spirit of the invention, or exceeding the scope of the following claims.

What is claimed is:

1. A method of separating the head from the body of a shrimp consisting in directing against the shrimp a blast of fluid under sufficient pressure to cause the head to be severed from the body.

2. A method of severing the head from the body of a shrimp consisting in directing a stream of fluid at high velocity against the juncture of the head and body of the shrimp to cause the head to separate from the body.

3. A method of beheading shrimp consisting in moving the shrimp through a sheet-like blast of fluid under sufficient pressure to cause the heads of the shrimp to be knocked off of their bodies by the impact of the fluid against the joints connecting the heads with the bodies of the shrimp.

4. A method of beheading shrimp comprising in supporting the shrimp, directing a stream of fluid at high velocity in a direction substantially perpendicular to the supported shrimp, and relatively moving the shrimp and fluid stream to cause the latter to strike the junctures of the heads with the bodies of the shrimp to sever the heads from the bodies.

5. A method of beheading shrimp comprising in placing the shrimp upon a horizontal support, directing a blast of fluid at high velocity downwardly toward the supported shrimp, and moving the shrimp horizontally through the blast to cause it to strike the junctures of the heads and bodies of the shrimp to detach the heads from the bodies.

6. A method of beheading shrimp consisting in applying a blast of water under pressure to the juncture of the head with the body of a shrimp to blast the head from the body.

7. A method of beheading shrimp consisting in applying a blast of steam under pressure to the juncture of the head with the body of a shrimp to blast the head from the body.

8. A method of beheading shrimp consisting in applying a blast of compressed gas to the juncture of the head with the body of a shrimp to blow the head from the body.

9. A method of beheading shrimp consisting in subjecting the joints connecting the heads with the bodies of shrimp to the action of a blast of fluid under pressure.

10. A method of beheading shrimp consisting in subjecting the joints connecting the heads with the bodies of shrimp to the action of streams of fluid under pressure of 10 pounds and upward.

11. A method of beheading shrimp consisting in directing against the joints connecting the heads with the bodies of shrimp jets of fluid at such velocity that the mechanical force of the fluid detaches the heads from the bodies.

CHARLES ALLEN GREINER.
ELBERT FORRESTER GREINER.

REFERENCES CITED

The following references are of record in the file of this patent:

UNITED STATES PATENTS

| Number | Name | Date |
|---|---|---|
| 2,041,727 | Prytherch et al. | May 26, 1936 |
| 2,102,945 | Doxsee et al. | Dec. 21, 1937 |
| 2,337,188 | Geldermans et al. | Apr. 8, 1941 |
| 2,263,694 | Grayson | Nov. 25, 1941 |
| 2,263,697 | Grayson | Nov. 25, 1941 |
| 2,299,774 | Weems | Oct. 27, 1942 |
| 2,429,828 | Lapeyre et al. | Oct. 28, 1947 |